United States Patent
Orii et al.

(10) Patent No.: US 9,441,721 B2
(45) Date of Patent: Sep. 13, 2016

(54) STRAIN WAVE GEARING UNIT

(71) Applicant: Harmonic Drive Systems Inc., Shinagawa-ku, Tokyo (JP)

(72) Inventors: Daisuke Orii, Azumino (JP); Yoshihide Kiyosawa, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 0 days.

(21) Appl. No.: 14/646,271

(22) PCT Filed: Sep. 12, 2013

(86) PCT No.: PCT/JP2013/074746
§ 371 (c)(1),
(2) Date: May 20, 2015

(87) PCT Pub. No.: WO2015/037105
PCT Pub. Date: Mar. 19, 2015

(65) Prior Publication Data
US 2015/0285357 A1    Oct. 8, 2015

(51) Int. Cl.
*F16H 1/32*    (2006.01)
*F16H 49/00*   (2006.01)
*F16H 57/04*   (2010.01)

(52) U.S. Cl.
CPC ........ *F16H 49/001* (2013.01); *F16H 57/0404* (2013.01); *Y10T 74/19* (2015.01)

(58) Field of Classification Search
None
See application file for complete search history.

(56) References Cited

U.S. PATENT DOCUMENTS

| | | | | |
|---|---|---|---|---|
| 2,906,143 A | * | 9/1959 | Walton | F16H 49/001 285/276 |
| 2,932,986 A | * | 4/1960 | Walton | F16H 49/001 74/640 |
| 3,372,646 A | * | 3/1968 | Pinkas | F04C 2/084 418/102 |
| 4,425,822 A | * | 1/1984 | Marschner | F16H 57/04 74/640 |
| 4,479,403 A | * | 10/1984 | Marschner | F16H 57/04 74/640 |

(Continued)

FOREIGN PATENT DOCUMENTS

| | | |
|---|---|---|
| JP | 60-012756 U | 1/1985 |
| JP | 09-053707 A | 2/1997 |
| JP | 2002-339990 A | 11/2002 |

OTHER PUBLICATIONS

JP 60012756 (English Translation), 16 pages including translation cover sheet.*

(Continued)

*Primary Examiner* — Victor Macarthur
(74) *Attorney, Agent, or Firm* — Buchanan Ingersoll & Rooney PC

(57) ABSTRACT

A strain wave gearing unit is provided with an internal gear, which surrounds the periphery of a cup-shaped external gear, and a bearing. An annular gap is formed between the inner ring of the bearing and the internal gear. The gap communicates with the sliding portions of the bearing and the section where the two gears mesh. An annular filter member made of non-woven fabric is fitted in the gap. Foreign matter such as abrasion powder, which is contained in lubricant that flows in the gap, is trapped by the filter member. The present invention can prevent penetration of abrasion powder generated in the sliding portions into the meshing section via the gap.

5 Claims, 3 Drawing Sheets

(56) References Cited

U.S. PATENT DOCUMENTS

| | | | | |
|---|---|---|---|---|
| 5,934,157 A * | 8/1999 | Kobayashi | ............ | F16H 49/001 427/438 |
| 5,984,048 A * | 11/1999 | Kiyosawa | ............ | F16H 49/001 184/6.12 |
| 6,065,362 A * | 5/2000 | Kiyosawa | ............ | F16H 49/001 74/460 |
| 6,082,222 A * | 7/2000 | Kiyosawa | ............ | F16H 49/001 219/76.1 |
| 6,119,553 A * | 9/2000 | Yamagishi | ......... | F16C 33/6644 277/410 |
| 6,564,677 B1 * | 5/2003 | Kiyosawa | ............... | F16H 35/10 475/162 |
| 6,981,478 B2 * | 1/2006 | Schafer | ................... | F01L 1/022 123/90.15 |
| 8,677,963 B2 * | 3/2014 | Stoltz-Douchet | ....... | F01L 1/344 123/90.11 |
| 2002/0026852 A1 * | 3/2002 | Kiyosawa | ............ | F16H 49/001 74/640 |
| 2002/0174742 A1 * | 11/2002 | Kobayashi | .............. | F16C 33/60 74/640 |
| 2004/0083850 A1 * | 5/2004 | Kobayashi | .............. | F16C 33/60 74/640 |
| 2004/0184691 A1 * | 9/2004 | Kobayashi | .............. | F16C 33/60 384/492 |
| 2005/0199201 A1 * | 9/2005 | Schafer | ................... | F01L 1/022 123/90.17 |
| 2010/0319569 A1 * | 12/2010 | Miki | ........................ | B61C 9/46 105/108 |
| 2011/0000394 A1 * | 1/2011 | Miki | ........................ | B61C 9/46 105/96 |

OTHER PUBLICATIONS

International Search Report (PCT/ISA/210) mailed on Nov. 26, 2013, by the Japanese Patent Office as the International Searching Authority for International Application No. PCT/JP2013/074746.

* cited by examiner

US 9,441,721 B2

STRAIN WAVE GEARING UNIT

TECHNICAL FIELD

The present invention relates to a strain wave gearing unit in which an internally toothed gear and a cup-shaped externally toothed gear are supported by a bearing so as to be capable of relative rotation. More specifically, the present invention relates to a strain wave gearing unit in which foreign substances such as abrasion powder produced in the bearing are prevented from infiltrating the meshing portions of the internally toothed gear and the externally toothed gear, and foreign substances such as abrasion powder produced in the meshing portions are prevented from entering the raceway of the bearing.

BACKGROUND ART

A strain wave gearing unit having a cup-shaped externally toothed gear is proposed in Patent Document 1. In this strain wave gearing unit, a cross roller bearing is disposed on the rear side of the cup-shaped externally toothed gear. A cylindrical unit housing is disposed so as to enclose the external periphery of the cup-shaped externally toothed gear. An internally toothed gear is integrated in the inner peripheral portion of the front end side in the unit housing, i.e., with the inner peripheral portion of the side opposite the cross roller bearing. An outer race of the cross roller bearing is secured to the unit housing, and an inner race thereof is secured to a boss of the externally toothed gear. The two gears are supported by the cross roller bearing so as to be capable of relative rotation.

PRIOR ART DOCUMENTS

Patent Documents

[Patent Document 1] JP-A 2002-339990

SUMMARY OF THE INVENTION

Problems To Be Solved By The Invention

In the strain wave gearing unit described above, the meshing portions of the internally toothed gear and the externally toothed gear are positioned on the front side in the direction of a unit center axis, and sliding portions in the cross roller bearing (sliding portions between the rollers and the raceway surfaces of the inner and outer races) are positioned on the rear side in the direction of the unit center axis. The meshing portions of the two gears are separated from the sliding portions of the bearing in the direction of the unit center axis.

In some circumstances, a flat strain wave gearing unit having a short dimension in the direction of the unit center axis is needed. A possible option for flattening the strain wave gearing unit is to utilize the space on the external peripheral side of the cup-shaped externally toothed gear to dispose the cross roller bearing. For example, the internally toothed gear and the cross roller bearing are disposed in parallel so as to enclose the cup-shaped externally toothed gear. The strain wave gearing unit can thereby be flattened more so that when the cup-shaped externally toothed gear and the cross roller bearing are aligned in the direction of the unit center axis.

In this case, the sliding portions of the cross roller bearing are positioned in proximity to the external peripheral side of the meshing portions of the two gears. The inner race of the cross roller bearing also faces the internally toothed gear, which rotates integrally with the outer race, across a slight gap. Therefore, there is a high risk that foreign substances such as abrasion powder produced in the sliding portions of the bearing will move to the meshing portions of the two gears through the annular gap formed between the inner race and the internally toothed gear, and infiltrate these meshing portions. Similarly, there is a risk that foreign substances such as abrasion powder produced in the meshing portions of the two gears will infiltrate the raceway of the cross roller bearing. For example, because the material of the bearing is harder than the material of the two gears, there is a concern that areas such as the tooth surfaces of the two gears will be scratched when abrasion powder and the like gets in the meshing portions of the two gears.

An object of the present invention, in view of these matters, is to provide a strain wave gearing unit in which foreign substances produced in the bearing can be prevented from getting in the meshing portions of the internally toothed gear and the cup-shaped externally toothed gear, and foreign substances produced in the meshing portions can be prevented from getting in the raceway of the bearing.

MEANS TO SOLVE THE PROBLEMS

To achieve the object described above, the strain wave gearing unit of the present invention is characterized in comprising:

a rigid internally toothed gear;

a flexible externally toothed gear disposed on the inner side of the internally toothed gear;

a wave generator for causing the externally toothed gear to flex in a radial direction and partially mesh with the internally toothed gear, the wave generator being fitted to the inner side of the externally toothed gear;

a bearing for supporting the internally toothed gear and the externally toothed gear so that the gears are capable of relative rotation;

an annular gap formed between the internally toothed gear and an inner race of the bearing; and an annular filter member fitted in the gap;

the sliding portions of the bearing and meshing portions between the internally toothed gear and the externally toothed gear communicating via the gap; and the filter member being formed from a fibrous material or a porous material having a predetermined porosity capable of trapping foreign substances included in a lubricant flowing through the gap.

The filter member can be formed from a material having a porosity that can let lubricant through and trap foreign substances. For example, the filter member can be formed from a nonwoven fabric or a foamed material.

If the filter member is a stacked filter member, foreign substances of different sizes can be effectively trapped, and the necessary liquid-permeability (the fluidity of the lubricant) can be guaranteed. For example, the stacked filter member can be configured by stacking at least a first filter member having a first porosity and a second filter member having a second porosity different from the first porosity.

The present invention can be applied to a flat strain wave gearing unit having a cup-shaped externally toothed gear. In this case, the externally toothed gear comprises a cylindrical barrel part capable of flexing in the radial direction, external teeth formed in the external peripheral surface portion in one end side of the cylindrical barrel part, and a diaphragm extending radially inward from the other end of the cylindrical barrel part. The bearing is disposed adjacent to the internally toothed gear in the direction of a unit center axis, and enclosing the portion of the cylindrical barrel part on the side of the diaphragm.

In this case, the gap is an annular gap formed between one inner race end surface in the inner race of the bearing, and a gear end surface of the internally toothed gear facing the inner race end surface from the direction of the unit center axis. The external peripheral gap portion in the gap communicates with the sliding portions via gap portions between the outer race and the inner race of the bearing, and an inner peripheral gap portion in the gap communicates with the meshing portions. The filter member is positioned between the inner peripheral gap portion and the external peripheral gap portion.

The strain wave gearing unit herein may have an output flange. In this case, the output flange is coaxially secured or integrally formed in the end of the inner race of the bearing that is on the side opposite the internally toothed gear, and the boss of the externally toothed gear is secured to the output flange.

In the strain wave gearing unit of the present invention, the filter member is fitted in a gap joined to both the sliding portions of the bearing (portions in the raceway) and the meshing portions of the two gears. Foreign substances such as abrasion powder produced in the sliding portions of the bearing are trapped by the filter member while moving with the lubricant through the gap. Foreign substances such as abrasion powder do not move toward the meshing portions of the two gears and infiltrate these meshing portions. Consequently, the occurrence of damage to areas such as the tooth surfaces of the two gears, caused by foreign substances produced in the side having the bearing, can be reliably prevented. Similarly, foreign substances produced in the meshing portions of the two gears are reliably prevented from getting in the raceway of the bearing. Therefore, according to the present invention, it is possible to avoid negative effects such as a reduction in the life of the two gears and a reduction in the life of the bearing caused by the infiltration of foreign substances.

The nonwoven fabric filter member can be disposed in a smaller space than when a common seal ring such as an O ring is used. Consequently, this is advantageous to flattening the strain wave gearing unit. The groove for fitting the filter member may also be shallow, and machining in the groove is therefore easier.

MODE FOR CARRYING OUT THE INVENTION

Figure 1:
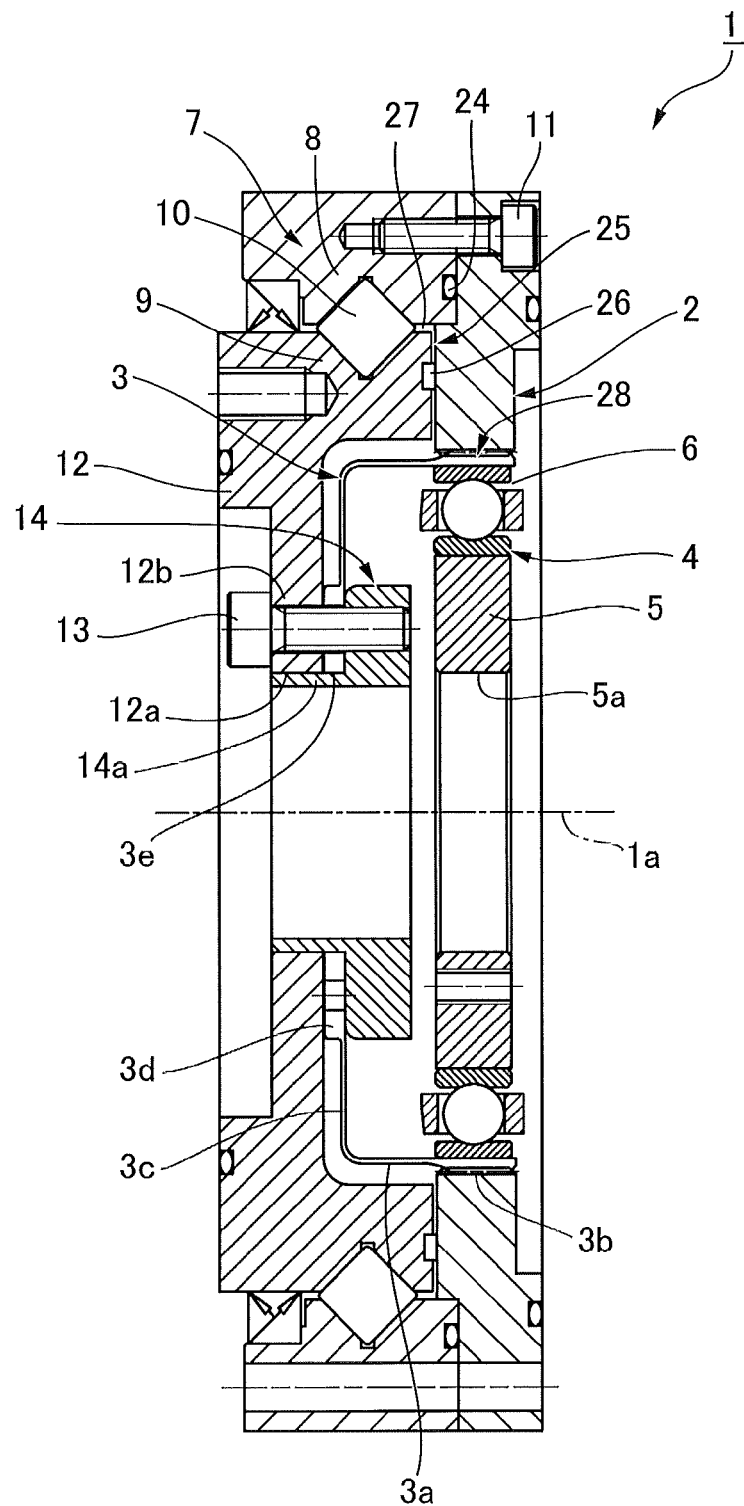
FIG. 1 is a longitudinal cross-sectional view of a strain wave gearing unit to which the present invention is applied.

An embodiment of a strain wave gearing unit to which the present invention is applied is described with reference to FIGS. 1 and 2.

A strain wave gearing unit 1 comprises an annular rigid internally toothed gear 2 having a rectangular cross section. A cup-shaped flexible externally toothed gear 3 is coaxially disposed on the inner side of the internally toothed gear 2. A wave generator 4, which causes the externally toothed gear 3 to flex into an ellipsoidal shape and partially mesh with the internally toothed gear 2, is disposed on the inner side of the externally toothed gear 3.

The cup-shaped externally toothed gear 3 comprises a cylindrical barrel part 3a capable of radially flexing, external teeth 3b formed in the external peripheral surface portion of one end side of the cylindrical barrel part 3a, a diaphragm 3c extending radially inward from the other end of the cylindrical barrel part 3a, and an annular boss 3d formed continuous with the inner peripheral edge of the diaphragm 3c. The wave generator 4 comprises a cam plate 5 having a center through-hole 5a, and a wave generator bearing 6 fitted on the ellipsoidal external peripheral surface of the cam plate 5.

A cross roller bearing 7, which is a unit bearing, is disposed adjacent to the internally toothed gear 2 in the direction of a unit center axis 1a. The portion of the cylindrical barrel part 3a of the externally toothed gear 3 other than the external-teeth-forming portion where the external teeth 3b are formed is enclosed by the cross roller bearing 7.

The cross roller bearing 7 comprises an outer race 8, an inner race 9, and a plurality of rollers 10 inserted so as to be free to roll in an annular raceway formed between the outer race 8 and the inner race 9. The outer race 8, which has a rectangular cross section, is fastened securely to the internally toothed gear 2 by a plurality of bolts 11. The outer race 8 can also be integrally formed in the internally toothed gear 2. The contact portions between the outer race 8 and rollers 10, as well as the contact portions between the inner race 9 and rollers 10, are sliding portions in the cross roller bearing 7.

A disc-shaped output flange 12 is integrally formed in the inner race 9 of the cross roller bearing 7. Specifically, the output flange 12 is integrally formed in the inner race 9 on the side opposite the internally toothed gear 2 in the direction of the unit center axis 1a. The output flange 12 can be made as a separate member and can be secured by bolts or the like to the inner race 9. The output flange 12 extends inward in a direction orthogonal to the unit center axis 1a.

A center through-hole 12a is formed in the center portion of the output flange 12, and the boss 3d of the externally toothed gear 3 is coaxially fastened securely by a plurality of bolts 13 to an inner peripheral edge portion 12b of the center through-hole 12a. Specifically, the inner peripheral edge portion 12b of the output flange 12 and a cylindrical pressing member 14 are coaxially stacked on either side of the boss 3d in the direction of the unit center axis 1a, and these three members are fastened securely by the bolts 13.

Formed in the pressing member 14 is a cylindrical portion 14a fitted into a center through-hole 3e of the boss 3d and the center through-hole 12a of the output flange 12. The output flange 12 and the externally toothed gear 3 are positioned so as to be coaxial by the cylindrical portion 14a.

Figure 2:
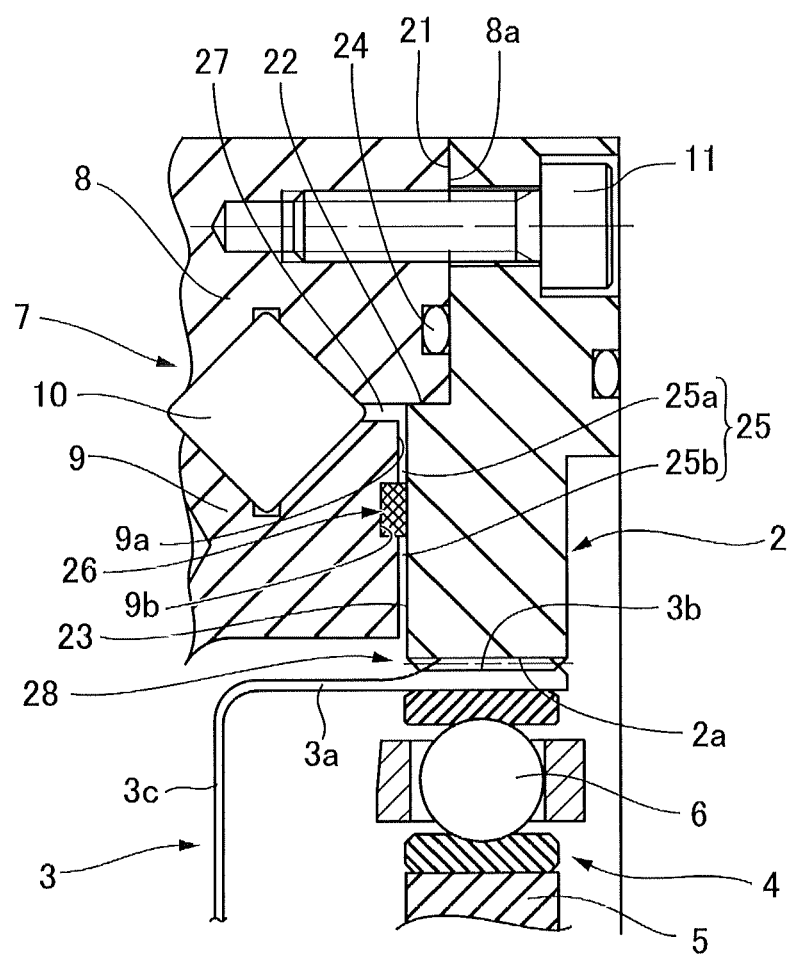
FIG. 2 is an enlarged partial cross-sectional view showing an enlargement of part of FIG. 1.

The following description primarily refers to FIG. 2. The shape of the end surface of the internally toothed gear 2, which faces the cross roller bearing 7, is defined by an external peripheral end surface 21, a circular external peripheral surface 22, and an internal peripheral end surface 23. The external peripheral end surface 21 extends from the end of the external peripheral surface of the internally toothed gear 2, inward along a direction orthogonal to the unit center axis 1a. The circular external peripheral surface 22 extends from the inner peripheral edge of the external peripheral end surface 21, in a direction parallel to the unit center axis 1a toward the cross roller bearing 7. The internal peripheral end surface 23 extends from the end of circular external peripheral surface 22 along a direction orthogonal to the unit center axis 1a, up to the inner peripheral edge of the internally toothed gear 2.

The external peripheral end surface 21 is in contact with an outer race end surface 8a of the cross roller bearing 7. An oil seal 24 such as an O ring is fitted between the external peripheral end surface 21 and the outer race end surface 8a to seal therebetween.

The internal peripheral end surface 23 faces an inner race end surface 9a of the cross roller bearing 7 across an extremely narrow annular gap 25. An annular groove 9b having a substantially rectangular cross section is formed partway through the inner race end surface 9a in the radial direction. An annular filter member 26 is fitted in this groove 9b. The filter member 26 is formed from a fibrous material or a porous material. For example, the filter member can be formed from nonwoven fabric or a foamed material. In the present example, a filter member 26 made of nonwoven fabric is used. The filter member 26 is also fitted in such a manner as to seal up the portion where the groove 9b is formed in the gap 25.

An external peripheral gap portion 25a of the gap 25, which is nearer the external periphery than the filter member 26, communicates with an annular gap 27 between the outer race inner peripheral surface and the inner race external peripheral surface. This gap 27 is joined to the annular raceway formed between the outer race 8 and the inner race 9, and therefore to the sliding portions. An inner peripheral gap portion 25b of the gap 25, which is near the inner side than the filter member 26, communicates with the meshing portion 28 between the internal teeth 2a of the internally toothed gear 2 and the external teeth 3b of the externally toothed gear 3.

The annular filter member 26 is fitted in a position in the gap 25 that is between the inner peripheral gap portion 25b and the external peripheral gap portion 25a. The filter member 26, which is formed from a fibrous material or a porous material having a predetermined porosity, is liquid-permeable enough for a lubricant flowing through the gap to pass through, and is capable of trapping foreign substances such as abrasion powder included in the lubricant. The filter member 26 can be formed from a nonwoven fabric made from a synthetic resin fiber such as, for example, polyester, PPS, PTEF, polyimide, polypropylene, or nylon. The filter member 26 can also be formed from a synthetic resinous foamed material.

The following description again refers to FIGS. 1 and 2. In the strain wave gearing unit 1, for example, the internally toothed gear 2 is fastened securely to a secured-side member (not shown), the cam plate 5 of the wave generator 4 is connected to a high-speed rotating shaft such as a motor shaft (not shown), and the output flange 12 secured to the externally toothed gear 3 is fastened to a driven-side member (not shown).

When the wave generator 4 is rotated, the positions where the external teeth 3b of the externally toothed gear 3 mesh with the internal teeth 2a of the internally toothed gear 2 move in the circumferential direction. Commonly, the externally toothed gear 3 is made to flex into an ellipsoidal shape by the wave generator 4, and the portions of the external teeth 3b positioned at the ends of the major axis of this ellipsoidal shape mesh with portions of the internal teeth 2a. In this case, the number of teeth of the externally toothed gear 3 is 2n less than the number of teeth of the internally toothed gear 2 (n being a positive integer).

Usually there are two (n=1) fewer teeth. Therefore, when the meshed positions move one rotation in the circumferential direction, the externally toothed gear 3 rotates relative to the internally toothed gear 2 in proportion to the difference in the number of teeth. The rotation, reduced by a reduction ratio according to the difference in the number of teeth, is outputted from the externally toothed gear 3 to a driven-side member (not shown) via the output flange 12.

While the strain wave gearing unit 1 is being driven to rotate, the rollers 10 of the cross roller bearing 7 roll along the raceway surfaces between the outer race 8 and the inner race 9. Foreign substances such as abrasion powder are produced from the sliding portions between the rollers 10 and the raceway surfaces. Foreign substances such as abrasion powder are similarly produced from the meshing portions 28 of the two gears 2, 3.

In the strain wave gearing unit 1, the cross roller bearing 7 encloses the external peripheral surface portion at the side of the diaphragm 3c in the cylindrical barrel part 3a of the externally toothed gear 3, adjacent to the internally toothed gear 2. Therefore, the strain wave gearing unit is flat, having a short dimension in the direction of the unit center axis 1a. Therefore, the sliding portions of the cross roller bearing 7 are positioned near the meshing portions 28 of the two gears 2, 3. The gap 25 extending in the radial direction is formed therebetween, and the filter member 26 is fitted in the gap 25.

Foreign substances produced in the side of the cross roller bearing 7 move through the gap 27 of the outer race 8 and the inner race 9, to the external peripheral gap portion 25a in the gap 25 between the inner race 9 and the internally toothed gear 2. The filter member 26 is fitted in the gap 25 in a manner so as to seal the gap 25. Foreign substances such as abrasion powder are trapped by the filter member 26, and only the lubricant flows through. Consequently, foreign substances such as abrasion powder produced in the side of the cross roller bearing 7 do not pass through the gap 25 and infiltrate the meshing portions 28 of the two gears 2, 3. Similarly, foreign substances produced in the side of the meshing portions 28 do not infiltrate the raceway of the cross roller bearing 7 through the gap 25.

It is therefore possible to reliably prevent damage to areas such as the tooth surfaces of the two gears 2, 3, resulting from foreign substances produced in the side of the cross roller bearing 7. Similarly, it is possible to reliably prevent foreign substances produced in the meshing portions 28 of the two gears 2, 3 from getting in the raceway of the cross roller bearing 7. Consequently, it is possible to avoid negative effects such as a reduction in the life of the two gears 2, 3 and a reduction in the life of the cross roller bearing 7 caused by foreign substances getting in.

The filter member 26 made of a nonwoven fabric can be disposed in a smaller space than when a seal ring such as a common O ring is used. Consequently, including the filter member 26 is not a hindrance to flattening the strain wave gearing unit 1. The groove 9b formed in the location where the filter member 26 is placed may be shallower than when a seal ring is included, and the groove is therefore more easily machined in.

Figure 3:
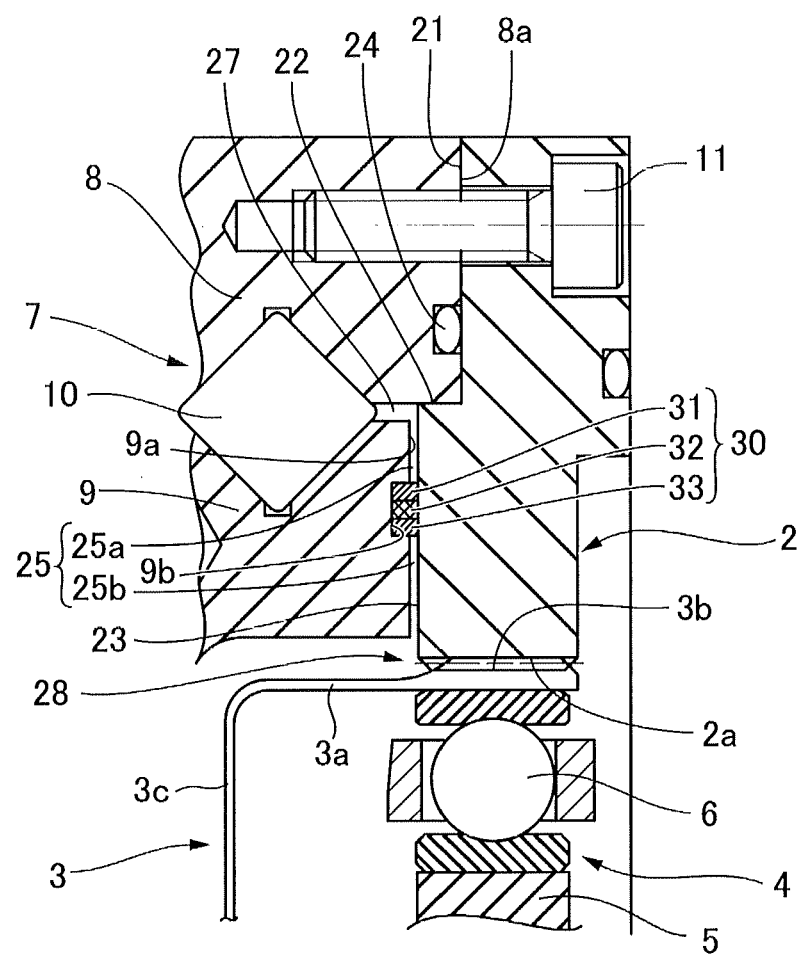
FIG. 3 is an enlarged partial cross-sectional view showing another example of a filter member.

Next, FIG. 3 is an enlarged partial cross-sectional view showing a stacked filter member that can be used in place of the filter member 26. The stacked filter member 30 is formed from a fibrous material or a porous material having a porosity capable of letting lubricant through and trapping foreign substances. The stacked filter member 30 of the present example is an annular stacked filter member made of a nonwoven fabric, in which a first filter member 31, a second filter member 32, and a third filter member 33 are stacked.

The first filter member 31 is formed from a nonwoven fabric having a first porosity. The second filter member 32 is formed from a nonwoven fabric having a second porosity less than the first porosity, and the third filter member 33 is formed from a nonwoven fabric having the same porosity as the first porosity. The first through third filter members 31 to 33 are stacked along the direction in which lubricant flows.

If the stacked filter member 30 is used, large-sized foreign substances are trapped by the first and third filter members 31, 33 on both sides, and small-sized foreign substances are trapped by the second filter member 32 in the middle. Consequently, foreign substances of different sizes can be effectively trapped. The stacked filter member 30 is also unlikely to be clogged, and the necessary liquid-permeability (the fluidity of the lubricant) can also be guaranteed.

The stacked filter member can also be composed of a stack of filter members made of different materials. For example, it is possible to use a stacked filter member composed of a nonwoven fabric filter member and a filter member made from a foamed material. It is also possible to use a stacked filter member of two, four, or more layers.

The invention claimed is:

1. A strain wave gearing unit comprising:
   a rigid internally toothed gear;
   a flexible externally toothed gear disposed on an inner side of the internally toothed gear;
   a wave generator for causing the externally toothed gear to flex in a radial direction and partially mesh with the internally toothed gear, the wave generator being fitted to an inner side of the externally toothed gear;
   a bearing for supporting the internally toothed gear and the externally toothed gear in a relatively rotatable manner;
   an annular gap formed between the internally toothed gear and an inner race of the bearing; and
   an annular filter member fitted in the gap, wherein
   a sliding portion of the bearing and a meshing portion between the internally toothed gear and the externally toothed gear are communicated via the gap, and
   the filter member is formed from a fibrous material or a porous material having a predetermined porosity capable of trapping foreign substances included in a lubricant flowing through the gap.

2. The strain wave gearing unit according to claim 1, wherein the filter member is formed from a nonwoven fabric or a foamed material.

3. The strain wave gearing unit according to claim 1, wherein
   the filter member is a stacked filter member, and
   the stacked filter member is configured by stacking at least a first filter member having a first porosity and a second filter member having a second porosity different from the first porosity.

4. The strain wave gearing unit according to claim 1, wherein
   the externally toothed gear has a cylindrical barrel part capable of flexing in a radial direction, external teeth formed in an external peripheral surface portion in one end side of the cylindrical barrel part, and a diaphragm extending radially inward from the other end of the cylindrical barrel part;
   the bearing is disposed adjacent to the internally toothed gear in a direction of a unit center axis, and encloses a portion of the cylindrical barrel part on a side of the diaphragm;
   the gap is an annular gap formed between one inner race end surface in the inner race of the bearing, and a gear end surface of the internally toothed gear facing the inner race end surface from the direction of the unit center axis;
   an external peripheral gap portion in the gap communicates with the sliding portions via a gap portion between the outer race and the inner race of the bearing;
   an inner peripheral gap portion in the gap communicates with the meshing portion; and
   the filter member is positioned between the inner peripheral gap portion and the external peripheral gap portion.

5. The strain wave gearing unit according to claim 4, wherein
   an output flange is coaxially secured or integrally formed in an end of the inner race of the bearing that is on a side opposite the internally toothed gear, and
   the boss of the externally toothed gear is secured to the output flange.

* * * * *